（12） United States Patent
Seo et al.

(10) Patent No.: US 9,921,736 B2
(45) Date of Patent: Mar. 20, 2018

(54) BENDABLE DISPLAY DEVICE AND DISPLAYING METHOD THEREOF

(71) Applicant: Samsung Electronics Co., Ltd., Gyeonggi-do (KR)

(72) Inventors: Joon-kyu Seo, Gyeonggi-do (KR); Kyung-a Kang, Seoul (KR); Ji-yeon Kwak, Seoul (KR); Hyun-jin Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/705,866

(22) Filed: Dec. 5, 2012

(65) Prior Publication Data

US 2013/0154970 A1 Jun. 20, 2013

(30) Foreign Application Priority Data

Dec. 16, 2011 (KR) .................. 10-2011-0136596

(51) Int. Cl.
G06F 3/0488 (2013.01)
G06F 1/16 (2006.01)
G06F 3/01 (2006.01)

(52) U.S. Cl.
CPC .......... *G06F 3/0488* (2013.01); *G06F 1/1626* (2013.01); *G06F 1/1643* (2013.01); *G06F 1/1652* (2013.01); *G06F 1/1694* (2013.01); *G06F 3/016* (2013.01)

(58) Field of Classification Search
None
See application file for complete search history.

(56) References Cited

U.S. PATENT DOCUMENTS

| 7,443,380 | B2 | 10/2008 | Nozawa |
| 7,755,605 | B2 | 7/2010 | Daniel et al. |
| 8,082,003 | B2 | 12/2011 | Jee |
| 8,581,859 | B2 | 11/2013 | Okumura et al. |
| 8,922,531 | B2 | 12/2014 | Lee |
| 2004/0041800 | A1* | 3/2004 | Daniels ................ 345/204 |
| 2005/0140646 | A1 | 6/2005 | Nozawa |

(Continued)

FOREIGN PATENT DOCUMENTS

| CN | 101782804 | 7/2010 |
| CN | 102141878 | 8/2011 |

(Continued)

OTHER PUBLICATIONS

European Search Report dated Jun. 18, 2015 issued in counterpart application No. 12858552.8-1957, 6 pages.

(Continued)

*Primary Examiner* — David D Davis
(74) *Attorney, Agent, or Firm* — The Farrell Law Firm, P.C.

(57) ABSTRACT

A bendable display method and device are provided. The bendable display device includes a display unit including a display screen, a sensing unit that senses a user manipulation, and a control unit that modifies a display of the display screen according to the user manipulation sensed by the sensing unit. The display device is bendable under external pressure into a rolled state in which the display screen of the display unit forms an outer wall, and the display unit displays the display on the display screen in the rolled state.

16 Claims, 21 Drawing Sheets

(56) References Cited

U.S. PATENT DOCUMENTS

| | | | |
|---|---|---|---|
| 2008/0158171 A1 | 7/2008 | Wong et al. | |
| 2010/0029327 A1* | 2/2010 | Jee | G04G 17/045 |
| | | | 455/556.1 |
| 2010/0045705 A1 | 2/2010 | Vertegaal et al. | |
| 2010/0066685 A1* | 3/2010 | Cain et al. | 345/173 |
| 2010/0117975 A1* | 5/2010 | Cho | 345/173 |
| 2010/0120470 A1* | 5/2010 | Kim et al. | 455/566 |
| 2010/0164888 A1 | 7/2010 | Okumura | |
| 2010/0171708 A1 | 7/2010 | Chuang | |
| 2011/0187681 A1* | 8/2011 | Kim | G06F 1/1652 |
| | | | 345/204 |

FOREIGN PATENT DOCUMENTS

| | | |
|---|---|---|
| EP | 2 192 750 | 6/2010 |
| EP | 2 207 079 | 7/2010 |
| EP | 2 357 548 | 8/2011 |
| JP | 11-225443 | 8/1999 |
| JP | 11-327433 | 11/1999 |
| JP | 2004-133086 | 4/2004 |
| JP | 2005-174006 | 6/2005 |
| JP | 2009-289101 | 12/2009 |
| JP | 2010157060 | 7/2010 |
| KR | 102010002665 | 2/2010 |
| KR | 1020100082286 | 7/2010 |
| WO | WO 2011/142935 | 11/2011 |

OTHER PUBLICATIONS

Chinese Office Action dated Jul. 16, 2015 issued in counterpart application No. 201280069834.7, 13 pages.
Chinese Office Action dated Sep. 9, 2016 issued in counterpart application No. 201280069834.7, 16 pages.
Japanese Office Action dated Oct. 3, 2016 issued in counterpart application No. 2014-547093, 7 pages.
Chinese Office Action dated Feb. 13, 2017 issued in counterpart application No. 201280069834.7, 14 pages.
European Search Report dated Aug. 25, 2017 issued in counterpart application No. 12858552.8-1879, 4 pages.

* cited by examiner

100

100

BENDABLE DISPLAY DEVICE AND DISPLAYING METHOD THEREOF

PRIORITY

This application claims priority under 35 U.S.C. § 119(a) to Korean Patent Application No. 10-2011-0136596, which was filed on Dec. 16, 2011, in the Korean Intellectual Property Office, the entire disclosure of which is incorporated herein by reference.

BACKGROUND

1. Field of the Invention

The present invention relates generally to a display device and method, and more particularly, to a bendable display device including a display unit that is flexible by an external pressure and a display method thereof.

2. Description of the Related Art

Currently, flexible display devices are being developed. Unlike a conventional rigid display device, which maintains a planar state, a flexible display may be folded or rolled up.

Conventionally, the rolling of the flexible display has developed mainly for a rollable wide screen device, which provides increased portability. However, utilizing the display in rolled state is seldom considered. Further, because the big screen has to be unrolled to be used, usability is deteriorated, e.g., when a user simply wants to get a call or check messages.

Further, although there have been some applications of a flexible display on a wearable device, such as on a wrist, except for the rollability, the wrist-wearable flexible display provides no difference from a conventional rigid flat screen. For example, when using a touch screen display, the wrist-wearable, flexible, touch screen display adopts the same touch input as used in the conventional rigid touch screen, providing no distinctive operations or display characteristics for a display in a rolled configuration.

SUMMARY

The present invention is designed to address at least the problems and/or disadvantages described above and to provide at least the advantages described below.

Accordingly, an aspect of the present invention is to provide a display device including a flexible display unit bendable under external pressure, which provides various distinctive operations and display characteristics in rolled state, and a method for changing a screen mode using the same.

In accordance with an aspect of the present invention, a display device is provided, which includes a display unit which displays a screen, a sensing unit which senses manipulation by a user, and a control unit which reconstructs the screen of the display unit and displays the resultant screen according to a result of sensing at the sensing unit.

The display device may be bendable under external pressure into a rolled state in a column shape in which the screen of the display unit forms an outer wall, and the display unit may display the screen in the rolled state.

If a user's manipulation is sensed, directing to rotate about an axis of rolling of the display device in the rolled state, the control unit may move a location of an object displayed on the screen of the display unit according to a direction of rotation.

The control unit may change the shape of the object displayed on the screen of the display unit and display the object according to rotational speed.

Upon sensing the user's manipulation including touching on the screen of the display device in the rolled state, and dragging or flicking to a direction in agreement with an axis of rolling, the control unit may move a location of an object displayed on the screen of the display unit according to the direction of the dragging or flicking.

If the screen of the display device in the rolled state is touched, the control unit may set an extension area with reference to a point of touch on the screen and extend a size of an object located within the extension area.

In a state that the screen of the display device is touched, if the point of touch is changed by rotation about the axis of rolling of the display device, the control unit may change the extension area with reference to the changed point of touch.

If the screen of the display device in the rolled state is touched, the control unit may set a shape changeable area with reference to a point of touch on the screen and changes the shape changeable area into a planar shape.

If the shape changeable area is changed into planar shape, the control unit may display additional information regarding an object displayed in the shape changeable area.

The display device may include a rechargeable battery unit, and a connector unit which is formed on a side of the display device to be connected to a recharger in the rolled state, and which provides power supplied from the recharger to the rechargeable battery unit to recharge the rechargeable battery unit. The display unit may display a state of recharge of the rechargeable battery unit during recharge process in the rolled state.

In accordance with another aspect of the present invention, a display method of a display device including a rollable display unit is provided, which includes displaying a screen in a rolled state, sensing a manipulation by a user, and reconstructing the screen and displaying a resultant screen according to a result of sensing. The display device may be bendable under external pressure into a rolled state in a column shape in which the screen of the display unit forms an outer wall.

If a user's manipulation is sensed, directing to rotate about an axis of rolling of the display device in the rolled state, the reconstructing the screen and displaying the resultant screen may include moving a location of an object displayed on the screen of the display unit according to a direction of rotation.

The reconstructing the screen and displaying the resultant screen may include changing the shape of the object displayed on the screen of the display unit and displays the object according to rotational speed.

Upon sensing the user's manipulation including touching on the screen of the display device in the rolled state, and dragging or flicking to a direction in agreement with an axis of rolling, the reconstructing the screen and displaying the resultant screen may include moving a location of an object displayed on the screen of the display unit according to the direction of the dragging or flicking.

If the screen of the display device in the rolled state is touched, the reconstructing the screen and displaying the resultant screen may include setting an extension area with reference to a point of touch on the screen and extends a size of an object located within the extension area.

In a state that the screen of the display device is touched, If the point of touch is changed by rotation about the axis of rolling of the display device, the reconstructing the screen and displaying the resultant screen may include changing the extension area with reference to the changed point of touch.

If the screen of the display device in the rolled state is touched, the reconstructing the screen and displaying the resultant screen may include setting a shape changeable area with reference to a point of touch on the screen and changing the shape changeable area into a planar shape.

If the shape changeable area is changed into planar shape, the display method may include displaying additional information regarding an object displayed in the shape changeable area.

The display device may additionally include a rechargeable battery unit, and a connector unit which is formed on a side of the display device to be connected to a recharger in the rolled state, and which provides power supplied from the recharger to the rechargeable battery unit to recharge the rechargeable battery unit, and the display method may additionally include displaying a state of recharge of the rechargeable battery unit during recharge process in the rolled state.

BRIEF DESCRIPTION OF THE DRAWINGS

The above and/or other aspects, features, and advantages of the present inventive concept will be more apparent from the from the following detailed description of certain embodiments of the present invention with reference to the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1A:
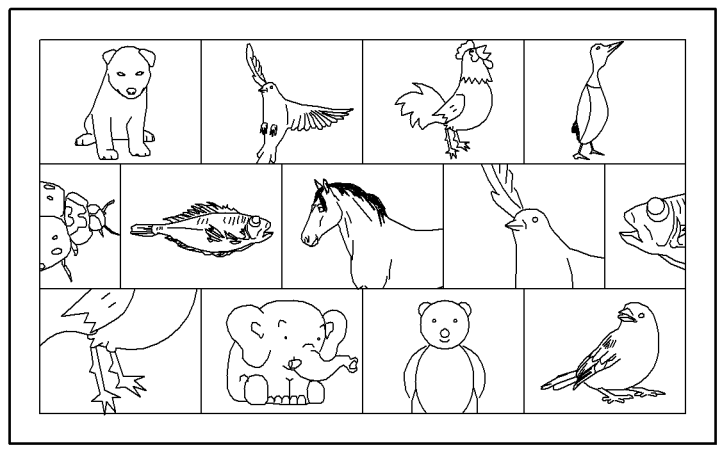
FIGS. 1A and 1B illustrate a display device in an unrolled state and rolled state, respectively, according to an embodiment of the present invention.
Figure 1B:
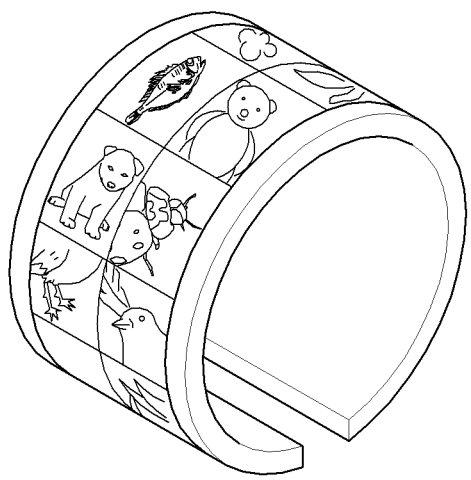

FIGS. 1A and 1B illustrate a display device in an unrolled state and rolled state, respectively, according to an embodiment of the present invention.

Referring to FIGS. 1A and 1B, a display device 100 in a planar form (FIG. 1A) may be rolled up into a scrolled state (FIG. 1B). As used herein, the display device 100 in a "rolled state" refers to the display device 100 as illustrated in FIG. 1B. Further, the display device 100 may be curved or bendable like a paper sheet. For example, the display device 100 may be a mobile phone, a Personal Digital Assistant (PDA), an MP3 player, an e-book, an ultra small Personal Computer (PC), a smart card, a Tablet, a Large Format Device (LFD), a laptop computer, a monitor, a TV, etc.

Figure 2A:
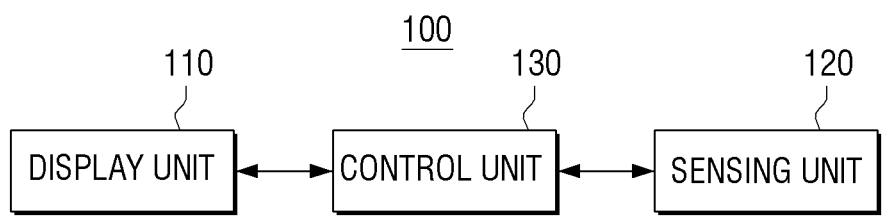
FIG. 2A is a block diagram illustrating a display device according to an embodiment of the present invention.

FIG. 2A is a block diagram illustrating the display device 100 according to an embodiment of the present invention.

Referring to FIG. 2A, the display device 100 includes a display unit 110, a sensing unit 120, and a control unit 130. As the display device 100 is bendable, i.e., rollable by an external pressure, when in a rolled state, a screen of the display unit 110 forms an outer wall. The display unit 110 may display various objects thereon, in which the object may include various forms including content, function menu, icon, photo, image, text, widget area, etc.

Meanwhile, the display unit 110 may be implemented as a thin board, e.g., made from plastic, and includes a display element such as e-paper, a Liquid Crystal Display (LCD), Thin Film Transistor-LCD (TFT-LCD), Organic Light Emitting Diode (OLED), etc.

The sensing unit 120 senses manipulations of the display device 100 made by a user, such as sensing rolling of the display device 100, and sensing further manipulation of the display device 100 in the rolled state, such as rotation, touch inputs, etc.

For example, the sensing unit 120 senses the state of bending, rotating, or touching of the display unit 110. As used herein, the "bending state" includes the degree, direction, or duration of bending of the display unit 110. The "rotating state" includes the direction, speed, or time of rotating the display unit 110 in rolled state. Further, the "touching state" includes types of touching (e.g., tapping, dragging, flicking, etc.), degree, direction, or duration of touching on the display unit 110 in rolled state. The above manipulation states may be sensed through a variety of sensors. For example, the sensing unit 120 may include at least one of a touch sensor, a band sensor, a motion sensor, a pressure sensor, and a tilt sensor.

More specifically, the sensing unit 120 perceives touching input by a user's fingertip or stylus pen using a touch sensor arranged on front of the display unit 110 and transfer the input touching information to the control unit 130.

Further, the sensing unit 120 may include a band sensor that converts information about a location at which the display unit 110 is bent or rolled into an electric signal. Accordingly, the sensing unit 120 may output different signals depending on the degree of folding or bending of the display unit 110. Accordingly, the control unit 130 then recognizes the location and degree of the folding or bending of the display unit 110 using the output values from the band sensor.

The band sensor may be arranged horizontally and perpendicularly on a rear surface of the display unit 110 at predetermined intervals to sense the tension applied on the rear surface of the display unit 110. When the display unit 110 bends, the level of tension applied on the band sensor differs depending on the area that bends. That is, the tension does not influence the band sensor in the perpendicular direction if the display unit 110 bends in horizontal direction, while the tension does not influence the band sensor in the horizontal direction if the display unit 110 bends in perpendicular direction.

Accordingly, by using the band sensor, the sensing unit 120 may sense the bent area of the display unit 110 with reference to the centerline of the area to which the highest level of tension is exerted, and sense the direction and degree (or angle) of bending of the display unit 110 according to the variation of the level of the tension sensed along an outer direction with reference to the centerline.

The motion sensors, which measure motion and the acceleration of the motion, may be arranged on a boundary area of the display unit 110. If the display unit 110 bends, the sensing unit 120 may determine the area of the display unit 110 that bends, and direction and degree (or angle) of the bending based on the direction of the acceleration and difference between the accelerations sensed through the respective motion sensors.

The pressure sensors may be arranged at a rear surface of the display unit 110 at predetermined intervals to sense the pressure exerted on the rear surface of the display unit 110. Thereafter, if the display unit 110 bends, the sensing unit 120 senses the area of the display unit 110 that bends, and direction or degree of the bending using the differences of the pressures sensed at the respective pressure sensors.

For example, if the display unit 110 bends, the area that bends is subject to higher pressure than the rest areas. Accordingly, using the variation of the pressure with reference to the area under the highest pressure, the sensing unit 120 senses the area of the display unit 110 that bends and the degree of such bending.

The sensing unit 120 may also sense the direction of the bending of the display unit 110 using the pressure sensor arranged in the proximity to the boundary area of the display unit 110.

For example, if a user bends the display unit 110 using a thumb and an index finger, the sensing unit 120 may sense the direction of the bending of the display unit 110 according to whether or not the pressure by the thumb is higher than the pressure by the index finger. That is, if the display unit 110 bends concavely with reference to the screen, the pressure by the thumb pressing on the front surface of the display unit 110 is detected to be higher, but if the display unit 110 bends convexly with reference to the screen, the pressure by the index finger pressing on a rear surface of the display unit 110 is detected to be higher. Accordingly, the sensing unit 120 may sense the direction of bending of the display unit 110 based on the difference between the pressures.

The tilt sensors, which sense tilting with reference to the direction of gravity, may be arranged on a rear surface of the display unit 110 at predetermined intervals from each other. Thereafter, the sensing unit 120 senses the area, direction, and degree of bending of the display unit 110 using the variations of tilting as sensed at the respective tilt sensors.

More specifically, if the display unit 110 bends, the sensing unit 120 senses the area that bends by connecting points with 0 tilting. It is possible to sense the direction of bending based on the variations of the tilting, because tilting values obtained when the display unit 110 bends concavely with reference to the screen are opposite to tilting values obtained when the display unit 110 bends convexly with reference to the screen.

As described above, the sensing unit 120 may sense the area, direction, and degree of bending of the display unit 110 using various sensors. Additionally, the sensing unit 120 transfers the result of sensing to the control unit 130.

The sensing unit 120 may sense at least one of the degree and direction of tilting of the display unit 110. Accordingly, the sensing unit 120 may include dual-axis, triple-axis acceleration sensor, or triple-axis gyro sensor, and transfer the result of sensing to the control unit 130.

The control unit 130 operates to reconstruct the screen of the display unit 110 according to the result of sensing at the sensing unit 120. The control unit 130 performs appropriate calibrations with respect to the results of sensing at the sensing unit 120.

More specifically, when detecting a rotation of the display device 100 in the rolled state, the control unit 130 may move a location of an object displayed on the screen of the display unit 110 according to the direction of rotation and display the result. The control unit 130 may analyze the angle and speed of rotation using the gyro sensors and acceleration sensors provided at the sensing unit 220, and control the information on the screen to rotate in the direction of rotation.

Further, the control unit 130 may change the shape of the object displayed on the screen of the display unit 110 in rolled state according to the speed of the rotation.

Further, when detecting a touching of the display device 100 in the rolled state, followed by dragging or flicking to a direction in agreement with the axis of rolling, the control unit 130 may move the location of the object displayed on the screen of the display unit 110 according to the direction of dragging or flicking and display the result. The control unit 130 may control the overall screen to be rotated and scrolled at the same time with speed that is proportional to the speed of the dragging or flicking.

Further, if the screen of the display device 100 in rolled state is touched, the control unit 130 may set an extension area with reference to a point of touch on the screen and extend the size of the object located within the extension area.

Further, if the screen of the display device 100 in rolled state is touched and then rotated about the axis of rolling of the display device 100, thereby changing the point of touch, the control unit 130 may change the extension area with reference to the changed point of touch.

The user may decrease or increase the radius of rolling to adjust the rate of extending.

Further, if the screen of the display device 100 in rolled state is touched, the control unit 130 may set a shape changeable area with reference to the point of touch on the screen and change the shape changeable area into planar shape.

The control unit 130 may also supplement the information of an object displayed on the planar-changed area. For example, upon a shape change, the control unit 130 may change the mode to detailed info view mode, preview mode, etc.

Further, if the display device 100 is in automatic rotation state, the control unit 130 may maintain the rotated state, while supplementing the information of the object displayed on the planar area.

Figure 2B:
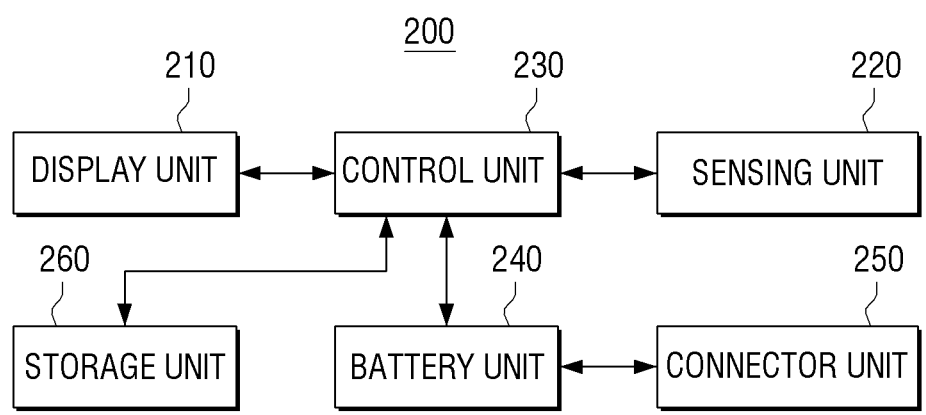
FIG. 2B is a block diagram illustrating a display device according to an embodiment of the present invention.

FIG. 2B is a block diagram illustrating a display device according to an embodiment of the present invention. A repetitive description of the overlapping elements of FIGS. 2A and 2B will not be provided.

Referring to FIG. 2B, the display device 200 includes a display unit 210, a sensing unit 220, a control unit 230, a battery unit 240, a connector unit 250, and a storage unit 260.

For example, the battery unit 240 may include a rechargeable battery.

The connector unit 250 may be formed on a side of the display device to be connected to a charger while the display device is in rolled state, to recharge the battery unit 140 by providing the power supplied from the connected recharger to the battery unit 140.

During recharging in rolled state, the display unit 210 may display the charging state off the battery unit 140. For example, the display unit 210 may display stepwise icon of battery-shaped bar or battery-shaped color.

Further, during recharging in rolled state, the display unit 210 may display notification information, e.g., breaking news, in a rotating scroll across the screen.

The storage unit 260 stores various operation information of the display device 100 in rolled state, and various contents displayable on the display unit 210. The storage unit 260 may be a hard disk, a flash memory, a Compact Flash (CF) card, a Secure Digital (SD) card, a Smart Media (SM) card, a MultiMedia card (MMC), memory stick, etc. Further, the storage unit 260 may be implemented separately from the display device 200.

Figure 3A:
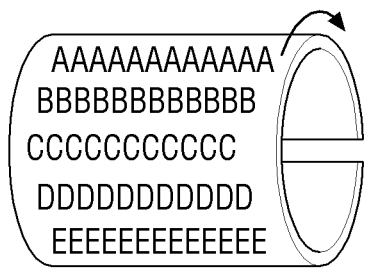
FIGS. 3A and 3B illustrate a display method according to an embodiment of the present invention.
Figure 3B:
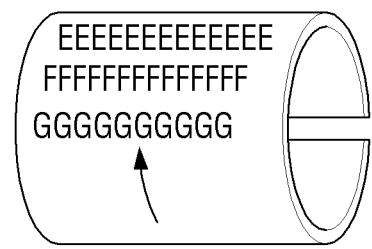

FIGS. 3A and 3B illustrate a display method according to an embodiment of the present invention.

Referring to FIG. 3A, if a display device in rolled state is rotated about the axis of rolling, the location of the object displayed on the screen may also change according to the direction of rotation of the display device as illustrated in FIG. 3B. For example, if the display device in rolled state is rotated clockwise, the objects displayed on the screen may be automatically scrolled clockwise. Further, although not illustrated, the speed at which the objects displayed on the screen are scrolled may be adjusted to correspond to the rotation speed of the display device.

Figure 4A:
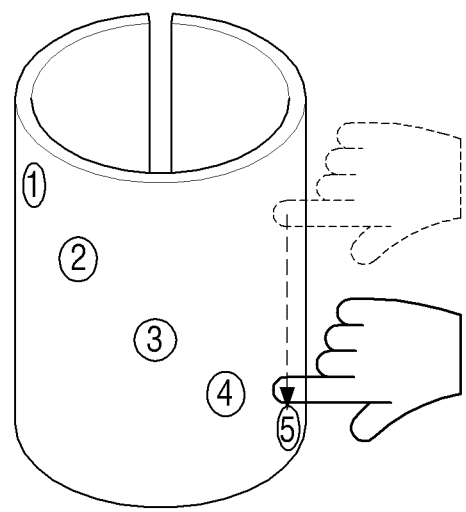
FIGS. 4A and 4B illustrate a display method according to an embodiment of the present invention.
Figure 4B:
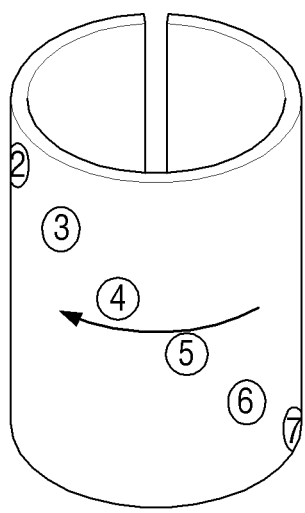
Figure 4B:
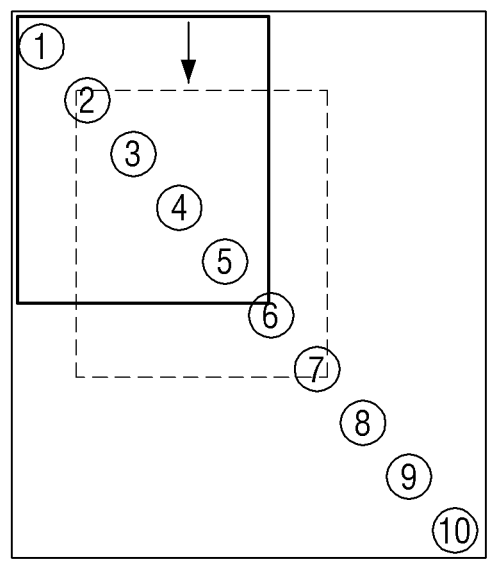

FIGS. 4A and 4B illustrate a display method according to an embodiment of the present invention.

Referring to FIG. 4A, if a user manipulation includes touching on the screen of a display device in rolled state, followed by dragging or flicking to a direction in agreement with the axis of rolling, as illustrated in FIG. 4B, the location of the object displayed on the screen may move according to the direction of dragging or flicking. For example, if a user command as input to the display device in rolled state includes scrolling perpendicularly, the information is rotated in at least one of horizontal and perpendicular directions automatically according to the scroll speed and displayed. As a result, the user is able to view the objects that were previously blocked from view.

Figure 5A:
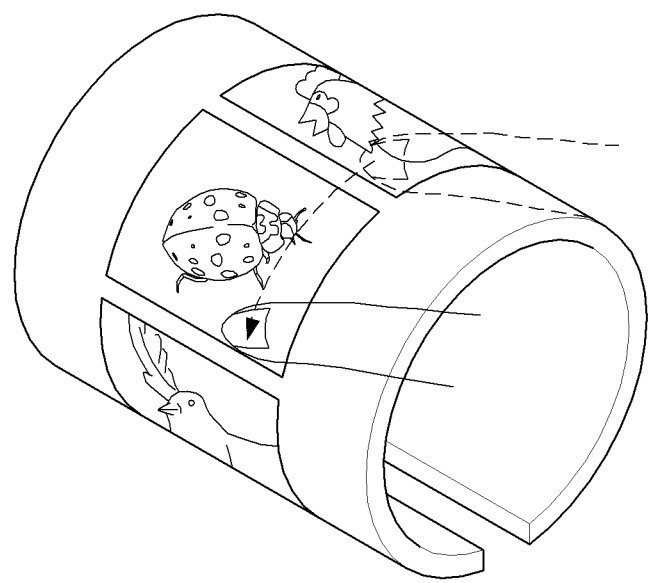
FIGS. 5A and 5B illustrate a display method according to an embodiment of the present invention.
Figure 5B:
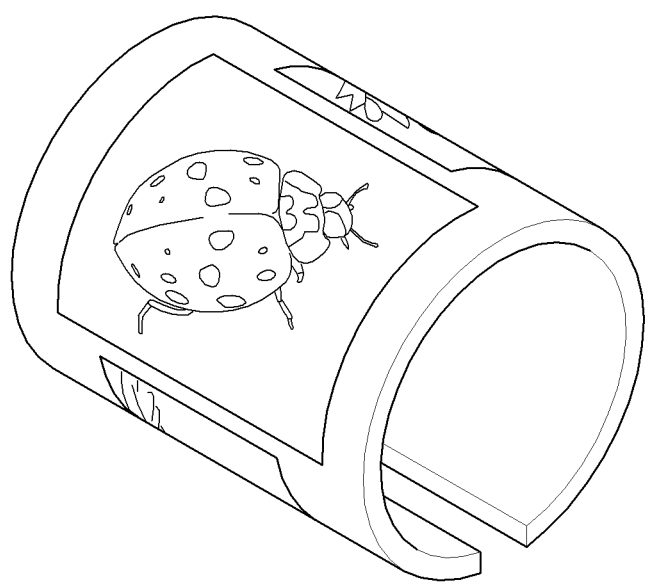

FIGS. 5A and 5B illustrate a display method according to an embodiment of the present invention.

Referring to FIG. 5A, if a user command to the display device in rolled state includes touching on the screen, followed by dragging or flicking in a direction perpendicular to the axis of rolling, as illustrated in FIG. 5B, the size of the object displayed on the dragged area may be extended and displayed. Additionally, the user command may include various other operations such as a drop touch command input more than a preset time, a circular touch command, a flick touch command, etc.

Figure 6A:
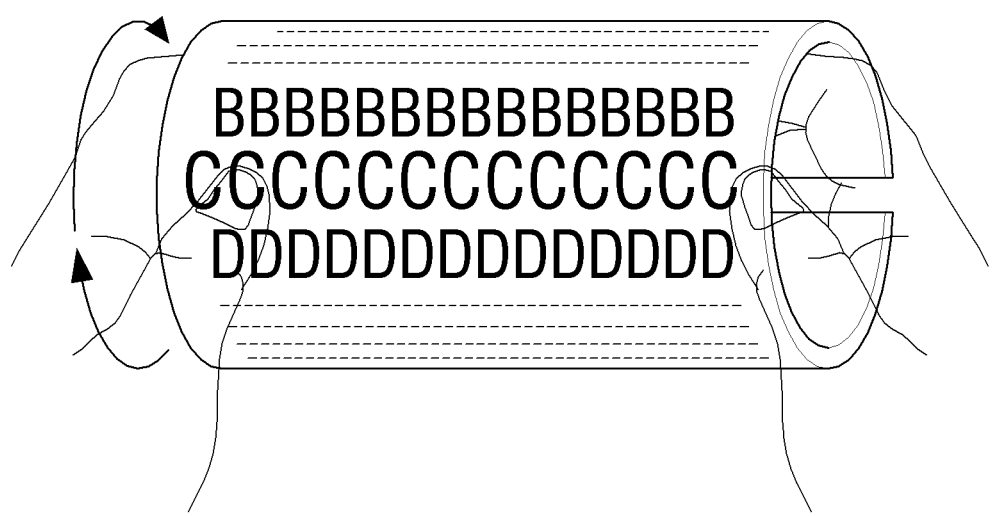
FIGS. 6A and 6B illustrate a display method according to an embodiment of the present invention.
Figure 6B:
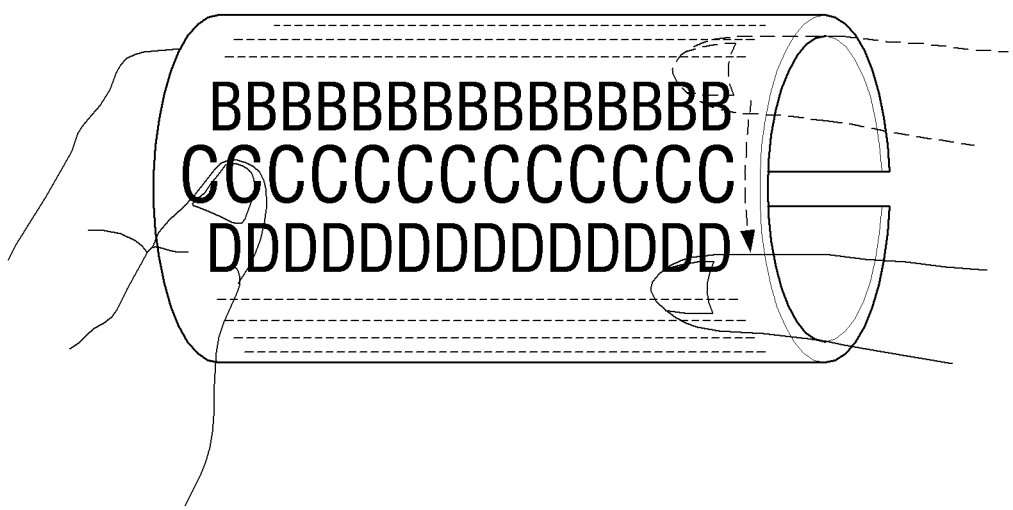

FIGS. 6A and 6B illustrate a display method according to an embodiment of the present invention.

Referring to FIGS. 6A and 6B, if the screen of the display device in rolled state is touched, the extension area may be set with reference to the touch point on the screen, and the size of the object located inside the extension area may be extended and displayed.

More specifically, referring to FIG. 6A, as a user grabs a specific area of the display device in rolled state and rotates with reference to the axis of rolling, the object moves along the direction of rotation, and the size of the object located inside the preset area is extended, i.e., enlarged, with reference to the point at which the user's finger touches.

By way of example, text-containing content or web page may be extended and displayed based on units of lines.

Further, it is possible to adjust the rate of extending by decreasing or increasing the radius of rolling.

Alternatively, referring to FIG. 6B, if a user scrolls on the display device in rolled state in a perpendicular direction to the axis of rolling, an object moves along the direction of scrolling, and the size of the object located inside the preset area may be extended with reference to the point at which the user's finger touches and displayed.

Although examples are provided to explain extending of the object, these are written only for illustrative purposes. Accordingly, other examples are possible. For example, an icon representing a magnifying glass may be generated at a corresponding area and moved in the scroll direction.

Figure 7A:
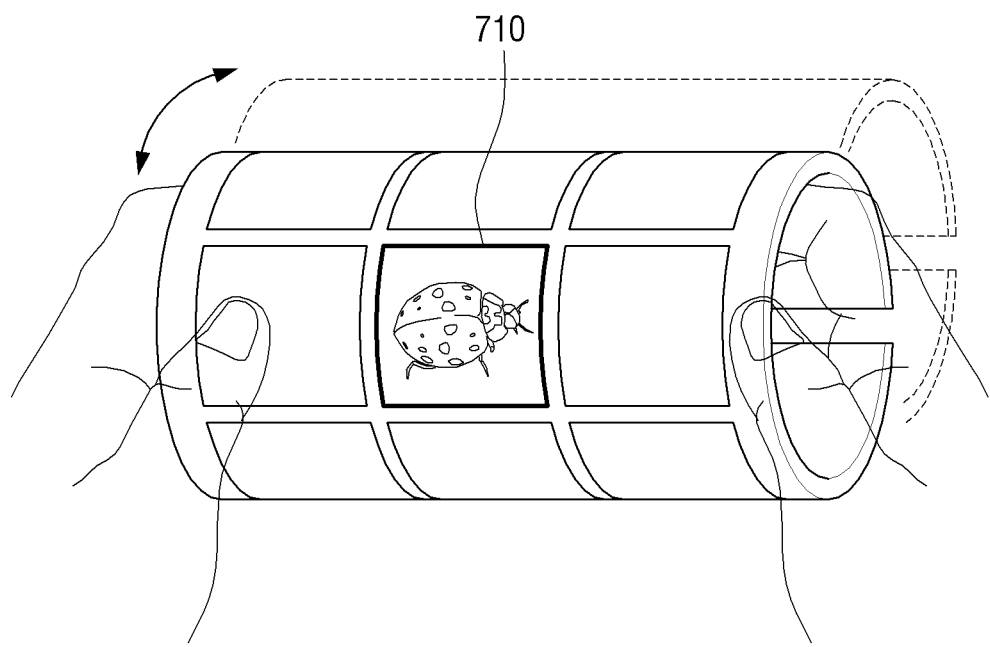
FIGS. 7A and 7B illustrate a display method according to an embodiment of the present invention.
Figure 7B:
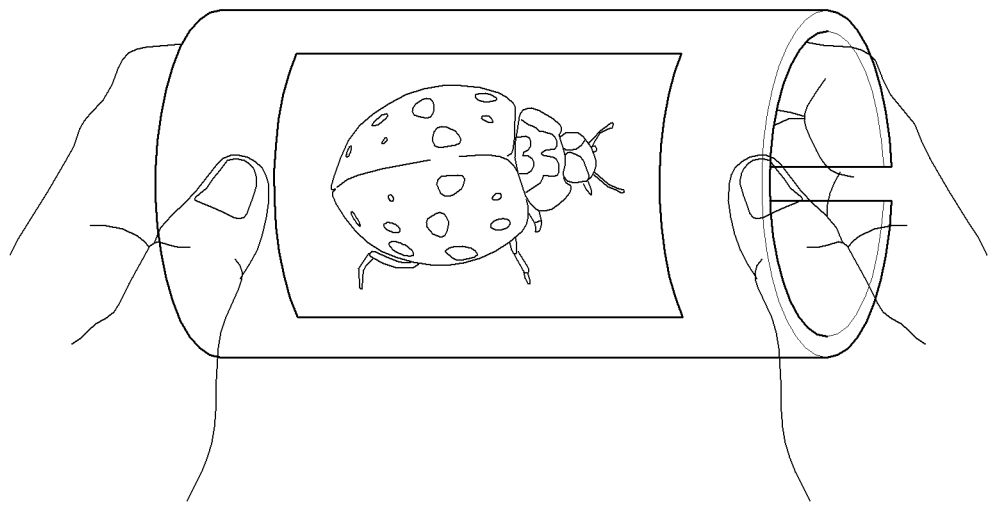

FIGS. 7A and 7B illustrate a display method according to an embodiment of the present invention.

Referring to FIG. 7A, if a user grabs a specific area of the display device in rolled state, and makes flicking motion of thrusting the display device forward, as illustrated in FIG. 7B, the size of the object displayed in the area at which the cursor 710 is located on the screen, may be extended, i.e., enlarged.

Figure 8A:
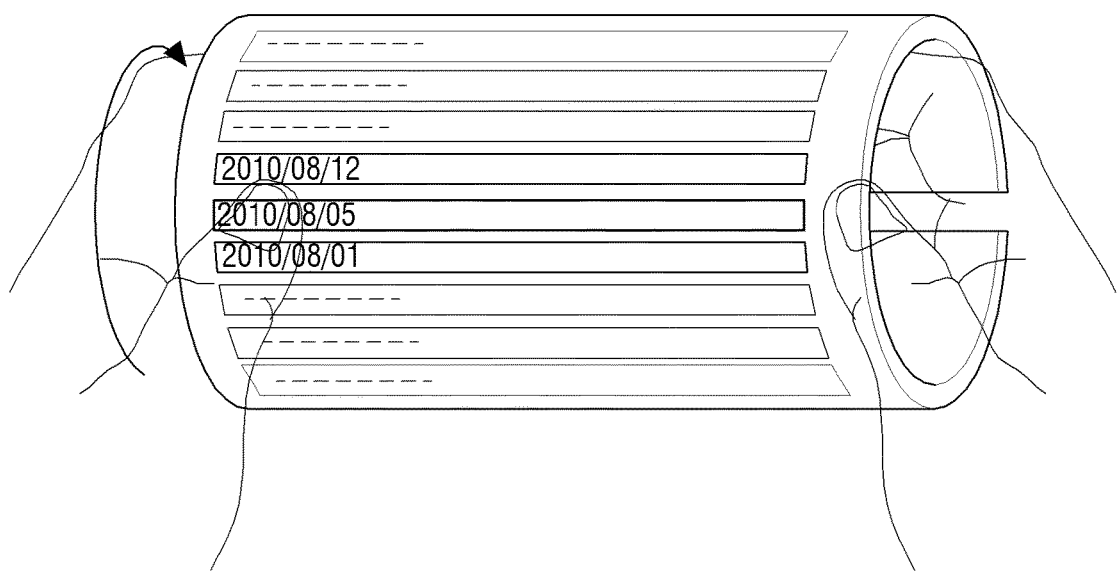
FIGS. 8A to 8C illustrate a display method according to an embodiment of the present invention.
Figure 8B:
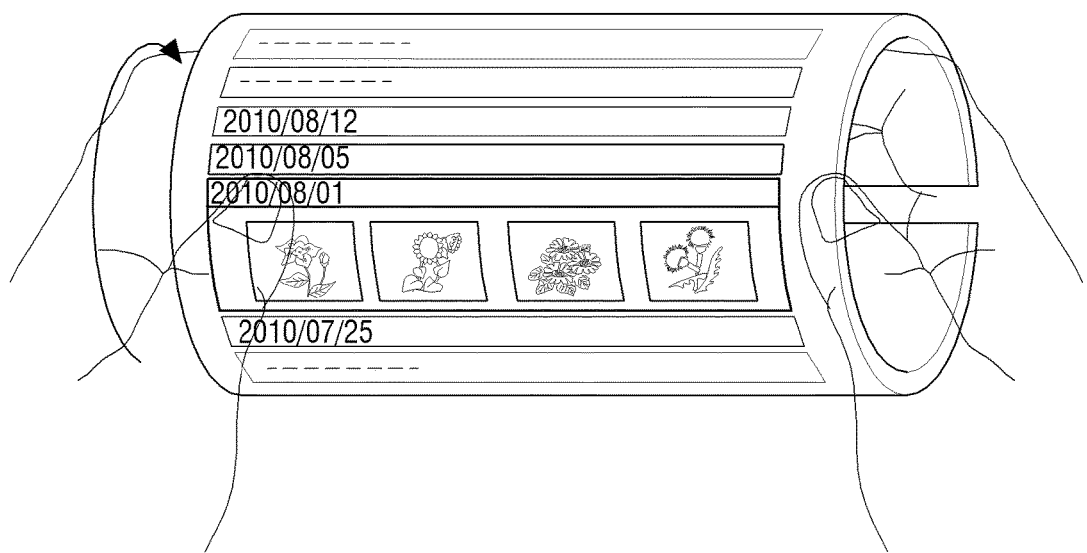
Figure 8C:
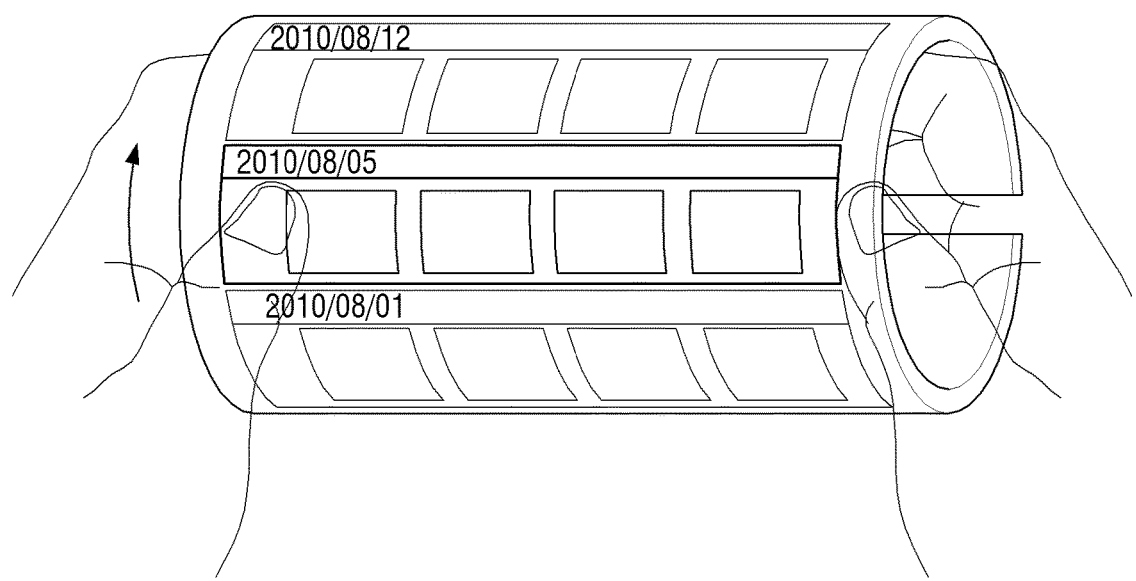

FIGS. 8A to 8C illustrate a display method according to an embodiment of the present invention.

Referring to FIG. 8A, if a user grabs a specific area of the display device in rolled state and rotates the display device faster than a preset speed, the display object may be displayed in a bar shape from which only the identification information is discernable. By doing so, the user may view as many objects as possible with the increased possibility of finding the right object.

Alternatively, referring to FIG. 8B, if the user grabs a specific area of the display device in rolled state and rotates faster than a preset speed, the size of the object located inside the preset area with reference to the point at which the user's finger touches, may be enlarged.

Further, referring to FIG. 8C, if the user grabs a specific area of the display device in rolled state and rotates slower than a preset speed, more detailed information about the object may be provided than when the display device is rotated faster than the preset speed as illustrated in FIG. 8B.

Although a plurality of content is displayed as the objects in folder form in the examples of FIGS. 8A to 8C, this is written only for illustrative purpose. Accordingly, various display forms may be implemented to suit the characteristics of the displayed objects.

Figure 9A:
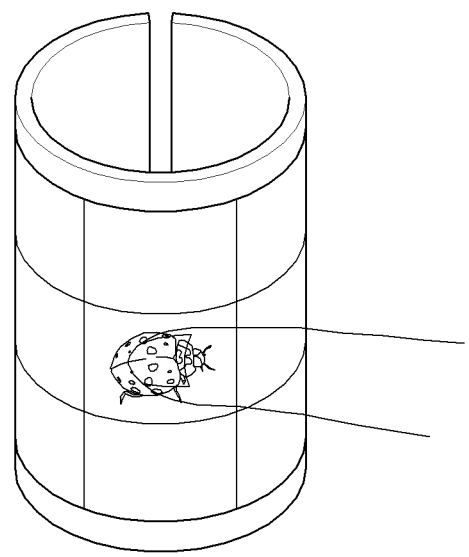
FIGS. 9A and 9B illustrate a display method according to an embodiment of the present invention.
Figure 9B:
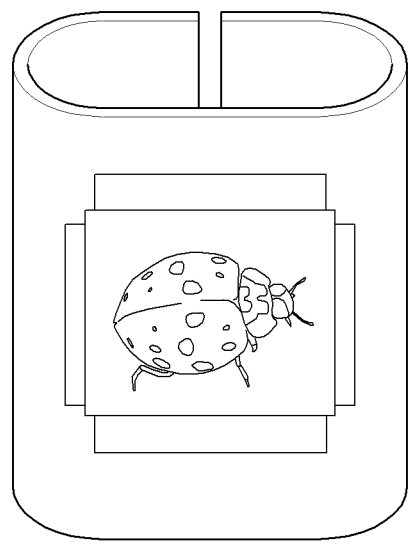

FIGS. 9A and 9B illustrate a display method according to an embodiment of the present invention.

Referring to FIG. 9A, if a user touches the screen of the display device in rolled state, a preset size of area with reference to the point of touch on the screen may be changed into a planar shape as illustrated in FIG. 9B. For example, the form of the touch may be implemented as at least one of a pressure of a preset size and a touch input for a preset time.

It is possible to determine the area to be changed into planar form based on one of touch sensing by the touch sensor and tension sensing by the band sensor. Accordingly, an object displayed at the point of touch may be displayed in two-dimensional planar shape.

Figure 10:
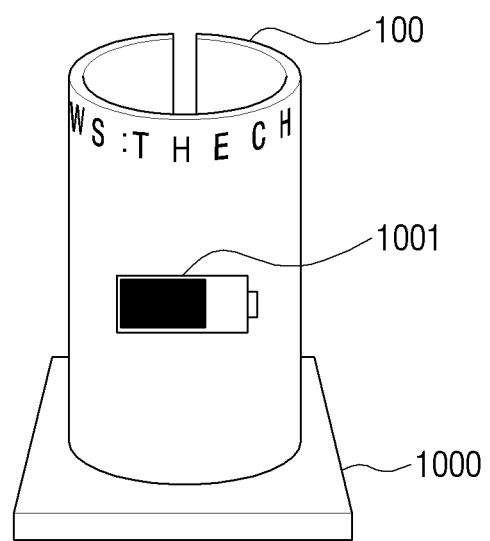
FIG. 10 illustrate a method for recharging a display device according to an embodiment of the present invention.

FIG. 10 illustrates a method for recharging a display device according to an embodiment of the present invention.

Referring to FIG. 10, the display device 100 in rolled state may be connected to a charger 1000 for recharging, and the state of the recharging process may be displayed on the screen of the display device in rolled state in display element 1001.

Figure 11:
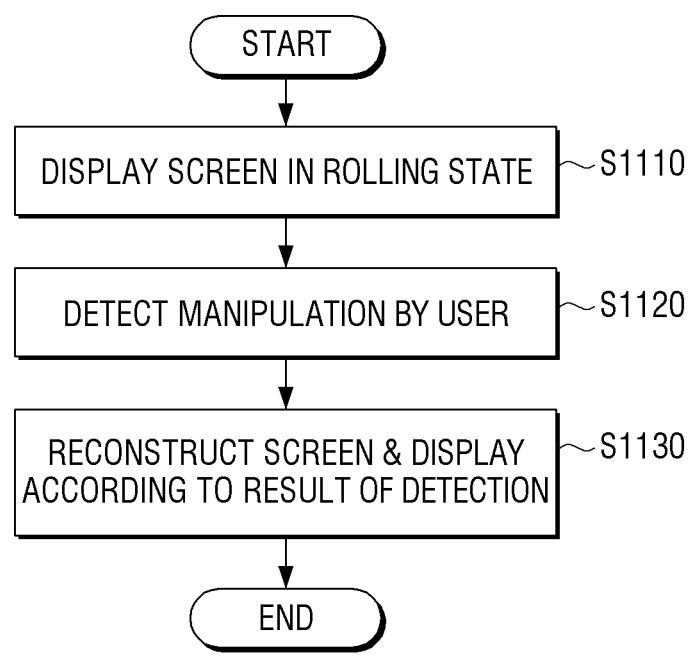
FIG. 11 is a flowchart illustrating a display method according to an embodiment of the present invention.

FIG. 11 is a flowchart illustrating a display method in a display device according to an embodiment of the present invention.

Referring to FIG. 11, in step S1110, recognizes that the display unit is in a rolled state. For example, the display device may be bent by external pressure from a user and rolled into column shape in which the screen of the display unit forms an outer wall, as illustrated in FIG. 1B.

In step S1120 a user manipulation is sensed, and in step S1130 the display is changed according to the sensed user manipulation. For example, the change in display includes, but is not limited to, the examples illustrated in FIGS. 3A, 3B, 4A, 4B, 5A, 5B, 6A, 6B, 7A, 7B, 8A, 8B, 8C, 9A, and 9C, and described above.

Additionally, a storage medium, i.e., a non-transitory computer-readable recording media including program to execute the display methods according to various embodiments may be provided. The computer-readable recording media may include all types of recording devices to which data readable by a computer system is stored. An example of the computer-readable recording media may include a Read Only Memory (ROM), a Random Access Memory (RAM), a Compact Disc-ROM (CD-ROM), magnetic tape, floppy disk, or optical data storage device, or alternatively, the computer-readable recording media may be distributed over a computer system connected via network to store and execute the code which is readable at a computer in a distributive manner.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A bendable display device, comprising:
 a display unit that comprises a displaying area and displays a first object on a first location of the displaying area;
 a sensing unit that detects rotation of the bendable display device; and
 a control unit that controls the display unit, if the rotation of the bendable display device which is in a rolled state is detected by the sensing unit while the first object is displayed on the first location of the displaying area, to move the first object from the first location to a second location of the displaying area according to a direction of the rotation, and in response to moving of the first object according to the rotation of the bendable display device, to move a second object displayed on a third location of the displaying area to the first location of the displaying area, wherein the locations of the first and the second objects are changed in the displaying area according to the rotation of the bendable display device.

2. The display device of claim 1, wherein the control unit changes a shape of the displayed object according to rotational speed.

3. The display device of claim 1, wherein, when a user manipulation including touching the display unit of the display device in the rolled state, and dragging or flicking in a direction in agreement with an axis of rolling is detected, the control unit controls the display unit to display the first object to move a location of the first object according to the direction of the dragging or flicking.

4. The display device of claim 1, when a user manipulation including touching the display unit of the display device in the rolled state is detected, the control unit sets an extension area with reference to a point of the touching and extends a size of the displayed object located within the extension area.

5. The display device of claim 4, wherein, if the point of the touching is changed by rotation about the axis of rolling of the display device, the control unit changes the extension area with reference to the changed point of the touching.

6. The display device of claim 1, wherein, when a user manipulation including touching the display unit of the display device in the rolled state is detected, the control unit sets a shape changeable area with reference to a point of the touching and changes the shape changeable area into a planar shape.

7. The display device of claim 6, wherein the control unit displays additional information regarding the object displayed in the shape changeable area.

8. The display device of claim 1, further comprising:
 a rechargeable battery unit; and
 a connector unit formed on a side of the display device to be connected to a charger, when the display device is in the rolled state,
 wherein the display unit displays a state of the rechargeable battery unit during a recharge processing in the rolled state.

9. A display method of a bendable display device including a bendable display unit, the method comprising:
 displaying a first object on a first location of a displaying area of the display unit;
 detecting a rotation of the bendable display device; and
 moving the first object from the first location to a second location of the displaying area according to the rotation of the bendable display device, if the rotation of the bendable display device which is in a rolled state is detected while the first object is displayed on the first location of the displaying area, and in response to moving of the first object according to the rotation of the bendable display device, moving a second object that displays on a third location of the displaying area to the first location of the displaying area, wherein the locations of the first and the second objects are changed in the displaying area according to the rotation of the bendable display device.

10. The display method of claim 9, further comprising: changing a shape of the displayed object according to rotational speed.

11. The display method of claim 9, wherein, when a user manipulation including touching on the display unit of the display device in the rolled state, and dragging or flicking in a direction in agreement with an axis of rolling is detected, displaying the first object to move a location of the first object according to the direction of the dragging or flicking.

12. The display method of claim 9, further comprising:
 when a user manipulation including touching the display unit is detected, setting an extension area with reference to a point of the touching; and
 extending a size of the displayed object located within the extension area.

13. The display method of claim 12, further comprising:
 when the point of the touching is changed by rotation about the axis of rolling of the display device, changing the extension area with reference to the changed point of the touching.

14. The display method of claim 9, further comprising:
when a user manipulation including touching the display unit in the rolled state is detected, setting a shape changeable area with reference to a point of the touching and changing the shape changeable area into a planar shape.

15. The display method of claim 14, further comprising displaying additional information regarding the object displayed in the shape changeable area.

16. The display method of claim 9, further comprising displaying a state of charge of a rechargeable battery unit included in the display device.

* * * * *